United States Patent [19]

Buschenhenke

[11] 4,168,848
[45] Sep. 25, 1979

[54] STREET VEHICLE WITH TWO VEHICLE SECTIONS CONNECTED VIA A LINK

[75] Inventor: Werner Buschenhenke, Hamburg, Fed. Rep. of Germany

[73] Assignee: Hamburger Hochbahn Aktiengesellschaft, Hamburg, Fed. Rep. of Germany

[21] Appl. No.: 933,900

[22] Filed: Aug. 15, 1978

[30] Foreign Application Priority Data

Aug. 25, 1977 [DE] Fed. Rep. of Germany ....... 2738311

[51] Int. Cl.² ............................................. B62D 53/06
[52] U.S. Cl. ................................. 280/446 B; 280/432
[58] Field of Search ............... 280/432, 446 R, 446 B, 280/474

[56] References Cited

U.S. PATENT DOCUMENTS

| 3,730,555 | 5/1973 | Keller | 280/432 |
| 4,106,792 | 8/1978 | Schultz | 280/432 |

Primary Examiner—Joseph E. Peters, Jr.
Assistant Examiner—R. Schrecengost
Attorney, Agent, or Firm—Sherman & Shalloway

[57] ABSTRACT

The invention provides a road vehicle having two vehicular sections connected together by an articulation joint having on each side thereof a shock-absorbing or arrester device having a pair of arms adapted to engage each other through an abutment when the two vehicular sections pivot relative to each other in one direction and to become disengaged from each other when the two vehicular sections pivot relative to each other in the other direction. The abutment of each pair of mutually engaging arms has an interlocking profile to prevent lateral movement therebetween, and stop mechanisms are provided to retain each arm when they are disengaged from each other, in such a position that when they next become engaged owing to said vehicular sections pivoting in said one direction, said arms are positioned for interlocking engagement with each other.

3 Claims, 2 Drawing Figures

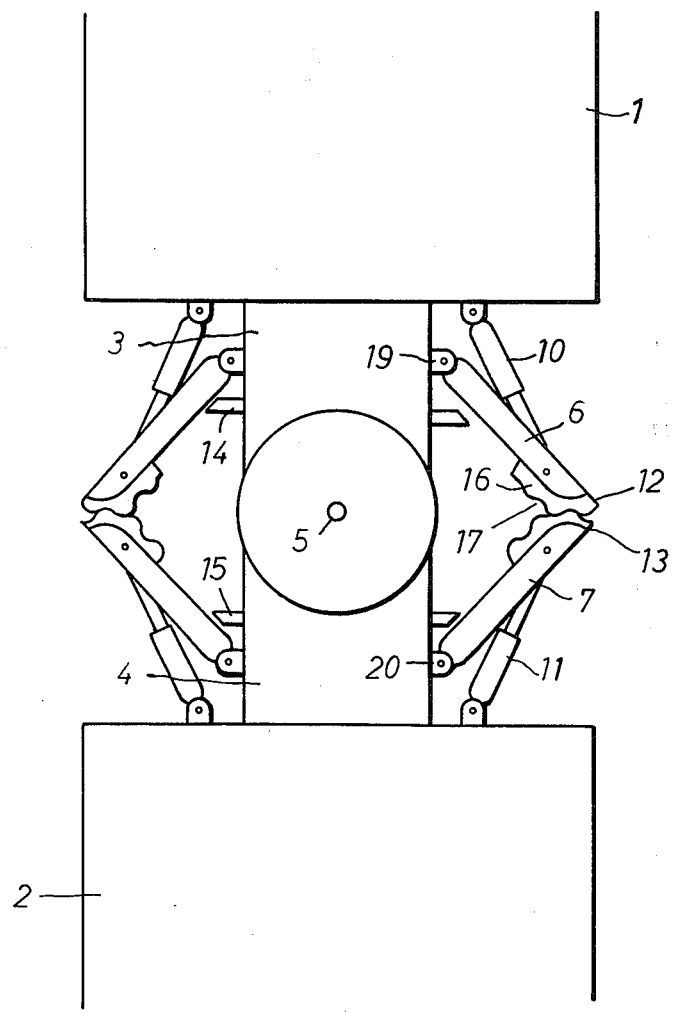

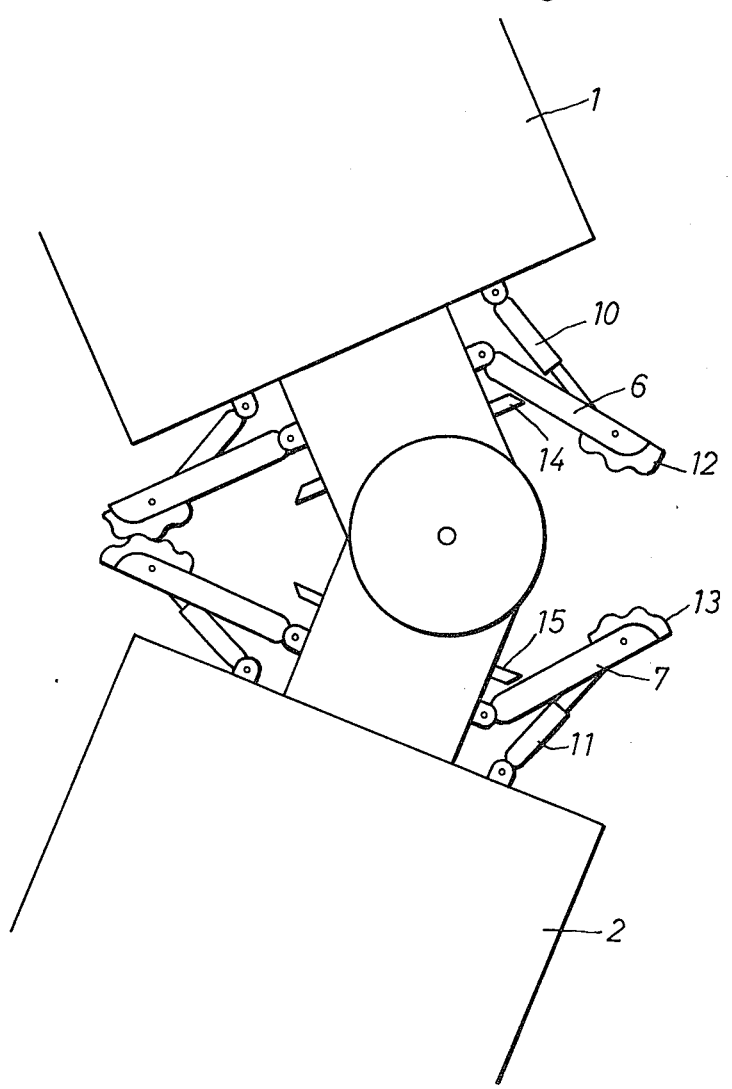

STREET VEHICLE WITH TWO VEHICLE SECTIONS CONNECTED VIA A LINK

BACKGROUND OF THE INVENTION

This invention relates to a road vehicle of the type having two vehicular sections linked to each other by an articulation joint, such a vehicle might be, for example, an omnibus-trailor combination. In such a vehicle shock-absorbing and/or arrester devices are provided on both sides of the articulation joint and each comprises a pair of pressure-loaded arms the ends of which engage each other through stop plates when the two vehicular sections pivot relative to each other in one direction and become disengaged from each other when the sections pivot relative to each other in the other direction.

Arms have previously been proposed having stop plates which are convexly arched against each other to provide for better rolling engagement. This generally results in satisfactory operation, although in many cases the shock-absorbing force alters in such a way that it causes jolting.

An object of the present invention is to provide a vehicle of the type mentioned initially with a shock-absorbing arrangement which obviates or mitigates any jolting effect.

SUMMARY OF THE INVENTION

The present invention therefore provides a road vehicle having two vehicular sections connected together by an articulation joint having on each side thereof a shock-absorbing or arrester device having a pair of arms adapted to engage each other through abutment means when the two vehicular sections pivot relative to each other in one direction and become disengaged from each other when the two vehicular sections pivot relative to each other in the other direction, the abutment means of each pair of mutually engaging arms having an interlocking profile to prevent lateral movement therebetween, and stop means being provided for retaining each arm when they are disengaged from each other, in such a position that when they next become engaged owing to said vehicular sections pivoting in said one direction, said arms are positioned for interlocking engagement with each other.

As a result of this arrangement, changes in the shock-absorbing force in the direction of jolting are avoided. This does not result from, as was first thought, a fault-free operation of the shock-absorbing hydraulics connected with the arms. In fact, it has now been found that when various absorption forces occur on the engaged arms, in prior art arrangements, relative movement in a lateral direction occurs between the abutment means of each arm. In the arrangement according to the present invention this lateral relative movement is prevented.

So that the abutment means can still "roll" perfectly on each other despite the elevations and depressions, the elevations and depressions are deliberately made in the form of cogging on the stop plates which are constructed convexly. So that the elevations and depressions engage properly with each other when the stop plates come together again after being separated, the above-mentioned stop means are provided, which ensure that the engaging arms occupy a definite position in the disengaged state, with the stop plates thereon.

An embodiment of the invention will now be described by way of example with reference to the accompany drawings in which:

BRIEF DESCRIPTION OF THE DRAWINGS

FIG. 1 is a diagrammatic plan view from above of the articulation zone of an articulated vehicle which is travelling in a straight line; and FIG. 2 is a corresponding plan view when the vehicle is travelling round a bend.

DETAILED DESCRIPTION OF THE INVENTION

The articulated vehicle has a front part 1 and a rear part 2. The chassis of each of the front and rear parts 1 and 2 are provided with extensions 3, 4 which extend towards each other to be linked by an articulation joints so that the parts 1 and 2 can pivot relative to each other about a vertical axis e.g. as shown in FIG. 2 when there is a bend to the left.

On each side of the articulation joint 5, there is provided a pair of arms 6 and 7, which are biassed towards each other by means of hydraulic devices 10, 11. It will be appreciated, however, that other devices could alternatively be provided instead of hydraulic ones, on order to produce in arms 6 and 7 a force controlling articulation against an inordinate or over quick pivotal movement on the vehicle travelling round a curve. The arms 6 and 7 are pivotally mounted on the extensions 3 and 4 for movement about pivots 19 and 20 respectively. The pivots 19 and 20 are located eccentrically to articulation joint 5. Furthermore, the arms 6 and 7 and hydraulic devices 10, 11 lie in a common plain perpendicular to the direction of the axis 5.

Arms 6 and 7, each carry abutment means in the form of stop plates 12 and 13 at their extremities and these stop plates are provided with undulating interlocking teeth or denticulations 16, 17. The engagement of the teeth ensures uniform and sustained engagement even when the loading forces applied by devices 10, 11 or the friction occurring at the pivots 19 or 20 are varied.

When the articulated vehicle is travelling round a bend in accordance with FIG. 2 the two vehicle parts lie at an acute angle to each other causing the arms 6 and 7 on the left hand side to be displaced so that they lie at a more acute angle to each other than under normal conditions. The arms 6, 7 on the right hand side become disengaged from each other. In this disengaged state, the position of the supporting arms is determined by stops 14, 15 against which the arms abut under the biassing force applied by the associated hydraulic device. The arms 6 and 7 therefore occupy a definite position which is selected so that the teeth of the stop plates 12, 13 engage properly again with each other when the parts 1 and 2 of the vehicle return to the straight ahead travelling position. The teeth may in appropriate circumstances be reduced to one tooth in the one plate and two teeth in the other plate.

We claim:
1. A road vehicle comprising:
a front vehicular section;
a rear vehicular section;
an articulation joint pivotally interconnecting said front and rear sections;
an arrester device on each side of said articulation joint having a pair of arms, said arms connected respectively to said front and rear sections, abutment means provided on said arms, said arms being adapted to engage each other through said abutment means when said vehicular sections pivot relative to each other in one direction and to become disengaged from each other when said two vehicular sections pivot relative to each other in the other direction, said abutment means of each pair of mutually engaging arms having an interlocking profile to prevent lateral movement therebetween; and stop means provided for retaining each arm, when they are disengaged from each other, in such a position that when they next become engaged, owing to said vehicular sections pivoting in said one direction, said arms are positioned for interlocking engagement with each other.

2. A road vehicle as claimed in claim 1, in which the interlocking profile of the abutment means of each pair of arms is formed by interlocking elevations and depressions.

3. A road vehicle as claimed in claim 1 in which each abutment means is disposed convexly about an axis parallel to the axis of articulation and is of denticulated form.

* * * * *